US008112357B2

(12) United States Patent  
Mueller et al.

(10) Patent No.: US 8,112,357 B2
(45) Date of Patent: Feb. 7, 2012

(54) SYSTEMS AND METHODS FOR PREVENTING DUPLICATIVE ELECTRONIC CHECK PROCESSING

(75) Inventors: Randall Lee Mueller, Kansas City, MO (US); V. Srinivas Nori, Norcross, GA (US); Benjamin T. Breeden, Jr., Eldersburg, MD (US)

(73) Assignees: Federal Reserve Bank of Atlanta, Atlanta, GA (US); Federal Reserve Bank of Richmond, Richmond, VA (US); Federal Reserve Bank of Kansas City, Kansas City, MO (US)

( * ) Notice: Subject to any disclaimer, the term of this patent is extended or adjusted under 35 U.S.C. 154(b) by 187 days.

(21) Appl. No.: 11/982,985

(22) Filed: Nov. 6, 2007

(65) Prior Publication Data

US 2008/0162320 A1    Jul. 3, 2008

Related U.S. Application Data

(60) Provisional application No. 60/857,666, filed on Nov. 7, 2006.

(51) Int. Cl.
*G06Q 40/00*    (2006.01)
(52) U.S. Cl. ............................. 705/45; 705/35
(58) Field of Classification Search ...... 705/45, 705/35
See application file for complete search history.

(56) References Cited

U.S. PATENT DOCUMENTS

| | | | |
|---|---|---|---|
| 4,264,808 A | 4/1981 | Owens et al. | |
| 4,270,042 A | 5/1981 | Case | |
| 4,523,330 A | 6/1985 | Cain | |
| 4,694,397 A | 9/1987 | Grant et al. | |
| 4,823,264 A | 4/1989 | Deming | |
| 4,948,174 A | 8/1990 | Thomson et al. | |
| 4,974,878 A | 12/1990 | Josephson | |
| 5,038,283 A | 8/1991 | Caveney | |
| 5,120,944 A | 6/1992 | Kern et al. | |
| 5,121,945 A | 6/1992 | Thomson et al. | |
| 5,187,750 A | 2/1993 | Behera | |
| 5,198,975 A | 3/1993 | Baker et al. | |
| 5,237,159 A | 8/1993 | Stephens et al. | |
| 5,265,007 A | 11/1993 | Barnhard et al. | |

(Continued)

OTHER PUBLICATIONS

"CONIX Systems Launches Dupe Detective; New Product Eliminates Cost and Liability of Processing Items Multiple Times." Business Wire May 18, 2006 p. 1.(3 pages).*

(Continued)

*Primary Examiner* — Elda Milef
(74) *Attorney, Agent, or Firm* — King & Spalding

(57) ABSTRACT

Preventing duplicate ICL files and/or ICL file elements, including duplicate ICLs, items, and item bundles, from being processed for payment and/or presentment. A duplicate detection module can assign a predictable and repeatable unique identifier to each ICL file and/or ICL file element. The duplicate detection module can determine whether each ICL file and/or element is a duplicate by comparing the identifier associated with the ICL file and/or element with information stored in a record of already processed files/elements. In response to determining that an ICL file and/or element is a duplicate, the duplicate detection module can determine not to process the file/element for payment and/or presentment. In response to determining that the ICL file and/or element is not a duplicate, the duplicate detection module can store information regarding the file/element in the record. For example, the stored information can include the unique identifier associated with the file/element.

69 Claims, 5 Drawing Sheets

U.S. PATENT DOCUMENTS

| | | | |
|---|---|---|---|
| 5,373,550 A | 12/1994 | Campbell et al. | |
| 5,412,190 A | 5/1995 | Josephson et al. | |
| 5,583,759 A | 12/1996 | Geer | |
| 5,600,732 A | 2/1997 | Ott et al. | |
| 5,668,897 A | 9/1997 | Stolfo | |
| 5,677,955 A | 10/1997 | Doggett et al. | |
| 5,680,611 A | 10/1997 | Rail et al. | |
| 5,687,250 A | 11/1997 | Curley et al. | |
| 5,689,579 A | 11/1997 | Josephson | |
| 5,692,065 A | 11/1997 | Prakash et al. | |
| 5,754,674 A | 5/1998 | Ott et al. | |
| 5,783,808 A | 7/1998 | Josephson | |
| 5,790,717 A | 8/1998 | Judd | |
| 5,819,236 A | 10/1998 | Josephson | |
| 5,832,140 A | 11/1998 | Stapleton et al. | |
| 5,930,778 A | 7/1999 | Geer | |
| 5,937,084 A | 8/1999 | Crabtree et al. | |
| 5,940,524 A | 8/1999 | Murayama et al. | |
| 5,963,654 A | 10/1999 | Prakash et al. | |
| 6,019,282 A | 2/2000 | Thompson et al. | |
| 6,097,834 A | 8/2000 | Krouse et al. | |
| 6,115,509 A | 9/2000 | Yeskel | |
| 6,170,744 B1 | 1/2001 | Lee et al. | |
| 6,236,756 B1 | 5/2001 | Kimura et al. | |
| 6,243,689 B1 | 6/2001 | Norton | |
| 6,351,546 B1 | 2/2002 | Murayama et al. | |
| 6,351,553 B1 | 2/2002 | Hayosh | |
| 6,450,403 B1 | 9/2002 | Martens et al. | |
| 6,571,000 B1 | 5/2003 | Rasmussen et al. | |
| 6,577,761 B1 | 6/2003 | Kanno et al. | |
| 6,585,775 B1 | 7/2003 | Cosentino et al. | |
| 6,658,139 B1 | 12/2003 | Cookingham et al. | |
| 6,717,592 B2 | 4/2004 | Gusler et al. | |
| 6,792,133 B2 | 9/2004 | Ott et al. | |
| 6,850,950 B1 | 2/2005 | Clarke et al. | |
| 6,854,656 B2 | 2/2005 | Matsumori | |
| 6,912,297 B2 | 6/2005 | Scott et al. | |
| 6,963,885 B2 | 11/2005 | Calkins et al. | |
| 6,996,263 B2 | 2/2006 | Jones et al. | |
| 7,000,828 B2 | 2/2006 | Jones | |
| 7,066,668 B2 | 6/2006 | Sandison et al. | |
| 7,066,669 B2 | 6/2006 | Lugg | |
| 7,082,216 B2 | 7/2006 | Jones et al. | |
| 7,092,560 B2 | 8/2006 | Jones et al. | |
| 7,099,845 B2 * | 8/2006 | Higgins et al. | 705/45 |
| 7,120,606 B1 | 10/2006 | Ranzini et al. | |
| 7,167,580 B2 | 1/2007 | Klein et al. | |
| 7,283,656 B2 | 10/2007 | Blake et al. | |
| 7,386,511 B2 | 6/2008 | Buchanan et al. | |
| 7,539,646 B2 | 5/2009 | Gilder et al. | |
| 7,546,275 B1 | 6/2009 | Herzberg et al. | |
| 2001/0039534 A1 | 11/2001 | Keene | |
| 2001/0051921 A1 | 12/2001 | Garner et al. | |
| 2002/0150279 A1 | 10/2002 | Scott et al. | |
| 2003/0158811 A1 | 8/2003 | Sanders et al. | |
| 2003/0202690 A1 | 10/2003 | Jones et al. | |
| 2003/0208421 A1 | 11/2003 | Vicknair | |
| 2003/0225704 A1 | 12/2003 | Park et al. | |
| 2004/0030621 A1 | 2/2004 | Cobb | |
| 2004/0068464 A1 | 4/2004 | Buchanan et al. | |
| 2004/0109596 A1 | 6/2004 | Doran | |
| 2004/0133516 A1 | 7/2004 | Buchanan et al. | |
| 2004/0143621 A1 | 7/2004 | Fredrickson et al. | |
| 2004/0148235 A1 | 7/2004 | Craig et al. | |
| 2004/0181485 A1 | 9/2004 | Finch | |
| 2004/0218203 A1 | 11/2004 | Mastie et al. | |
| 2004/0236688 A1 | 11/2004 | Bozeman | |
| 2005/0018896 A1 | 1/2005 | Heit et al. | |
| 2005/0044043 A1 | 2/2005 | Gooding et al. | |
| 2005/0071283 A1 | 3/2005 | Randle et al. | |
| 2005/0080719 A1 | 4/2005 | Sellen et al. | |
| 2005/0080738 A1 | 4/2005 | Sellen et al. | |
| 2005/0086136 A1 | 4/2005 | Love et al. | |
| 2005/0097046 A1 | 5/2005 | Singfield | |
| 2005/0097050 A1 | 5/2005 | Orcutt | |
| 2005/0109833 A1 | 5/2005 | Page | |
| 2005/0129300 A1 | 6/2005 | Sandison et al. | |
| 2005/0139670 A1 | 6/2005 | McGlamery | |
| 2005/0144131 A1 | 6/2005 | Aziz | |
| 2005/0171899 A1 * | 8/2005 | Dunn et al. | 705/39 |
| 2005/0175221 A1 | 8/2005 | Scott et al. | |
| 2005/0203857 A1 | 9/2005 | Friedman | |
| 2005/0211763 A1 | 9/2005 | Sgambati et al. | |
| 2005/0213805 A1 | 9/2005 | Blake et al. | |
| 2005/0220324 A1 | 10/2005 | Klein et al. | |
| 2005/0238252 A1 | 10/2005 | Prakash et al. | |
| 2005/0243378 A1 | 11/2005 | Klein et al. | |
| 2005/0243379 A1 | 11/2005 | Klein et al. | |
| 2005/0244035 A1 | 11/2005 | Klein et al. | |
| 2005/0252960 A1 | 11/2005 | Murata | |
| 2005/0256839 A1 | 11/2005 | Leong et al. | |
| 2005/0281448 A1 | 12/2005 | Lugg | |
| 2006/0006222 A1 | 1/2006 | Brey et al. | |
| 2006/0023930 A1 | 2/2006 | Patel et al. | |
| 2006/0045321 A1 | 3/2006 | Yu | |
| 2006/0045600 A1 | 3/2006 | Lugg | |
| 2006/0080245 A1 | 4/2006 | Bahl et al. | |
| 2006/0106717 A1 | 5/2006 | Randle et al. | |
| 2006/0112013 A1 | 5/2006 | Maloney | |
| 2006/0118613 A1 | 6/2006 | McMann et al. | |
| 2006/0133277 A1 | 6/2006 | Carozza | |
| 2006/0167784 A1 | 7/2006 | Hoffberg | |
| 2006/0182331 A1 | 8/2006 | Gilson et al. | |
| 2006/0182332 A1 | 8/2006 | Weber | |
| 2006/0184441 A1 | 8/2006 | Haschka et al. | |
| 2006/0186194 A1 | 8/2006 | Richardson et al. | |
| 2006/0188310 A1 | 8/2006 | Sandison et al. | |
| 2006/0188311 A1 | 8/2006 | Lugg | |
| 2006/0191998 A1 | 8/2006 | Mueller et al. | |
| 2006/0206427 A1 | 9/2006 | Love et al. | |
| 2006/0212391 A1 | 9/2006 | Norman et al. | |
| 2006/0229987 A1 | 10/2006 | Leekley | |
| 2006/0237526 A1 | 10/2006 | Mueller et al. | |
| 2006/0248009 A1 * | 11/2006 | Hicks et al. | 705/40 |
| 2006/0280354 A1 | 12/2006 | Murray | |
| 2007/0095888 A1 | 5/2007 | Mueller et al. | |
| 2007/0100672 A1 | 5/2007 | McBrida et al. | |
| 2007/0156438 A1 | 7/2007 | Popadic et al. | |
| 2007/0235518 A1 | 10/2007 | Mueller et al. | |
| 2007/0244782 A1 | 10/2007 | Chimento | |
| 2007/0288382 A1 * | 12/2007 | Narayanan et al. | 705/45 |
| 2008/0006687 A1 | 1/2008 | Mueller et al. | |
| 2008/0097899 A1 * | 4/2008 | Jackson et al. | 705/39 |
| 2008/0103790 A1 * | 5/2008 | Abernethy et al. | 705/1 |
| 2008/0159655 A1 | 7/2008 | Breeden et al. | |
| 2008/0162319 A1 | 7/2008 | Breeden et al. | |
| 2008/0162320 A1 | 7/2008 | Mueller et al. | |
| 2008/0162321 A1 | 7/2008 | Breeden et al. | |
| 2008/0162322 A1 | 7/2008 | Breeden et al. | |
| 2008/0247629 A1 | 10/2008 | Gilder et al. | |

OTHER PUBLICATIONS

"Alogent Offering Sierra Solution for Image Cash Letter Deposits; Image Cash Letter and Back Office Conversion Capabilities Optimized for Large Merchants and Correspondent Banks." Business Wire Oct. 10, 2005, p. 1, (2 pages).*

"Taking control of Payment Duplication: An in-depth look at a serious challenge created by Check 21". Conix Systems Inc. White Papers, Sep. 8, 2006. Retrieved Feb. 3, 2009 <http://www.comix.com/News/default.asp> (9 pages).*

"Microsoft Computer Dictionary". Fifth Edition. Microsoft Press. Copyright 2002 p. 248 (3 pages).*

("All My Papers tm, Creating Editing and Using Image Cash Letter, X9.37 Files." http://replay.web.archive.org/20060519041745/ http://www.ggx.com/solutions_7.htm> retrieved Apr. 26, 2011 (6 pages).*

"Vision, Strategy & Approach to Image Quality & Archive Integrity, A Review of Carreker's Current Initiatives Towards Image Quality Detection & Resolution", Federal Reserve System, Aug. 19, 2003, Copyright © 2003 Carreker Corporation, pp. 1-43.

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

"What is Check 21?", VSOFT Corporation, available at http://www.vsoftcorp.com/check21.htm.

"Check21 Cash Letter: Clear Check Images Rather than Paper Checks", SYMITAR, available at http://www.symitar.com/Default.aspx?P=2d1883d0-91be-496d-9047-64a83378dd36.

"Creating, Editing and Using Image Cash Letter, X9.37 Files", All My Papers, available at http://www.ggx.com/solutions_7.htm.

Greene, U.S. Appl. No. 11/482,379, Office Action, Sep. 30, 2009, 29 pages.

Greene, U.S. Appl. No. 11/482,379, Office Action, Jun. 10, 2009, 8 pages.

Greene, U.S. Appl. No. 11/482,379, Office Action, Sep. 29, 2008, 5 pages.

Labaze, U.S. Appl. No. 11/482,360, Office Action, Sep. 23, 2009, 8 pages.

Captovation Announces the Release of Check Capture 5.1; Newest Version of Check Imaging Software Includes Features to Facilitate Electronic Check Exchange and Presentment, Business Wire; New York, Aug. 10, 2006. p. 1, last accessed May 9, 2010, available online.

3.Next Stop: image exchange?, ABA Banking Journal (0194-5947), 2003. vol. 95, Issue 11, p. 10.

Holcomb, Notice 04-57, Aug. 27, 2004, Federal Reserve Bank of Dallas, 6 pages.

* cited by examiner

SYSTEMS AND METHODS FOR PREVENTING DUPLICATIVE ELECTRONIC CHECK PROCESSING

RELATED PATENT APPLICATION

This patent application claims priority under 35 U.S.C. §119 to U.S. Provisional Patent Application No. 60/857,666, entitled "Check Processing Using Substitute Check Images," filed Nov. 7, 2006, the complete disclosure of which is hereby fully incorporated herein by reference. This patent application also is related to co-pending U.S. patent application Ser. No. 11/983,034, entitled "Automated Return Item Re-Clear," filed Nov. 6, 2007, U.S. patent application Ser. No. 11/983 033, entitled "Prioritizing Checks for Electronic Check Processing," filed Nov. 6, 2007, U.S. patent application Ser. No. 11/983,032, entitled "System and Method for Processing Duplicative Electronic Check Return Files," filed Nov. 6, 2007, and U.S. patent application Ser. No. 11/982,923, entitled "System and Method for Processing Duplicative Electronic Check Reversal Files," filed Nov. 6, 2007. The complete disclosure of each of the foregoing related applications is hereby fully incorporated herein by reference.

FIELD OF THE INVENTION

The invention relates generally to preventing duplicative electronic check processing and more particularly to preventing duplicate image cash letter (ICL) files and/or ICL file elements, including duplicate ICLs, items, and item bundles, from being processed for payment and/or presentment.

BACKGROUND OF THE INVENTION

Effective Oct. 28, 2004, the Check Clearing for the 21st Century Act ("the Act") improved the ability of banks to use electronic images of paper checks by, for example, submitting those images, along with associated information, for electronic processing. Under the Act, if a receiving financial institution ("RI") or its customer requires a paper check, a paper image replacement document ("IRD"), such as a paper "substitute check," can be created from an electronic check image and associated electronic information. Such a substitute check meeting specified requirements is the legal equivalent of an original paper check, and an RI is required to accept the substitute check for payment. This process enables banks to reduce the costs and inconveniences associated with physically handling and transporting original paper checks.

Under the Act, the substitute check must be essentially an exact copy of the original paper check to be the legal equivalent of the original paper check. In particular, the substitute check must include an exact copy of all of the Magnetic Ink Character Recognition ("MICR") data provided on the original paper check and all check endorsements.

The terms "substitute check" and "IRD" generally are used interchangeably herein to refer to any electronic or paper document that can be used for electronic payment processing purposes, whether or not the document is the legal equivalent of a paper check negotiable instrument. The terms "bank," "customer," "RI," and "processing entity" generally are used herein to refer to any party performing conventional or electronic check processing at any stage, including depositing and receiving institutions, their non-bank subsidiaries and affiliates, and any non-bank third party agents that provide processing services to banks.

Typically, each electronic check is received for processing in an electronic image cash letter file (hereinafter an "ICL file"), which includes one or more electronic image cash letters ("ICLs"). Each ICL includes one or more bundles of items to be processed. Each bundle includes one or more items. The term "item" is used herein to refer to a check or an IRD or information that represents a check or an IRD. For a particular item, the ICL can include one or more electronic images of the item, the complete MICR data provided on the item, and additional financial data related to the item, such as endorsement information (hereinafter, "addenda data").

The ICL can further include a series of records related to the items. For example, for each bundle of items in the ICL, the ICL can include a bundle summary control record comprising information about the bundle, such as a bundle identification number, the number of items in the bundle, the value of each of the items in the bundle, and the total value of all the items in the bundle. The ICL also can include an ICL control record comprising information about the origin and destination of the ICL, and a cash letter bundle summary control record comprising a summary of all the bundle summary control records in the ICL. For simplicity, each ICL, bundle, item, image, record, or other component of an ICL file is referred to herein as an "element" of the ICL file.

In the traditional, paper processing arena, each check could be seen and touched throughout processing. Thus, in the traditional, paper processing arena, it was virtually impossible to process the same check twice. In Check 21, multiple banks are processing the same checks in an electronic environment. Because the banks are producing and processing electronic copies of the checks, the same check may be reproduced and processed two or more times. Thus, a check processor may receive duplicate ICL files and/or ICL file elements. Similarly, a check processor may produce and present duplicate ICL files and/or ICL file elements for payment. To date, banks have been unable to effectively prevent processing of such duplicate ICL files and/or ICL file elements.

Thus, a need exists in the art for a system and method for preventing duplicate ICL files and/or ICL file elements from being processed for payment and/or presentment.

SUMMARY OF THE INVENTION

The invention provides systems and methods for preventing duplicate ICL files and/or ICL file elements, including duplicate ICLs, items, and item bundles, from being processed for payment and/or presentment. A duplicate detection module of a check processing system can assign a predictable and repeatable unique identifier to each ICL file and/or ICL file element. The duplicate detection module can determine whether each ICL file and/or element is a duplicate by comparing the identifier associated with the ICL file and/or element with information stored in a record of already processed ICL files and elements.

Each unique identifier includes information related to the contents of its corresponding ICL file/element. In certain exemplary embodiments, the unique identifier can include a hashed value of certain information related to the ICL file/element, including a byte count of the ICL file/element and other objective metrics regarding the ICL file/element. For example, a unique identifier of an ICL file can include a total number of ICLs, bundles, and/or items in the file and/or a total value of the ICLs, bundles, and/or items in the file. The unique identifier also can be derived from information within the ICL file/element, including any information in any headers, records, or other elements within the ICL file/element.

In response to determining that an ICL file and/or element is a duplicate, the duplicate detection module can determine not to process the file/element for payment and/or presentment. In response to determining that the ICL file and/or element is not a duplicate, the duplicate detection module can store information regarding the file/element in the record. For example, the stored information can include the unique identifier associated with the file/element. Thus, if a duplicate of the ICL file/element is subsequently resubmitted for processing, the duplicate detection module can identify the subsequent ICL file/element as a duplicate by matching information in the duplicate ICL file/element and/or a unique identifier associated with the duplicate ICL file/element with the information stored in the record.

These and other aspects, objects, features, and advantages of the invention will become apparent to a person skilled in the art upon consideration of the following detailed description of illustrated exemplary embodiments, which include the best mode of carrying out the invention as presently perceived.

BRIEF DESCRIPTION OF THE DRAWINGS

FIG. 2, including

FIG. 3, including

DETAILED DESCRIPTION OF EXEMPLARY EMBODIMENTS

The invention is directed to preventing duplicative electronic check processing. In particular, the invention is directed to preventing duplicate ICL files, duplicate ICLs, and/or other duplicate ICL file elements, from being processed for payment and/or presentment.

The invention includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
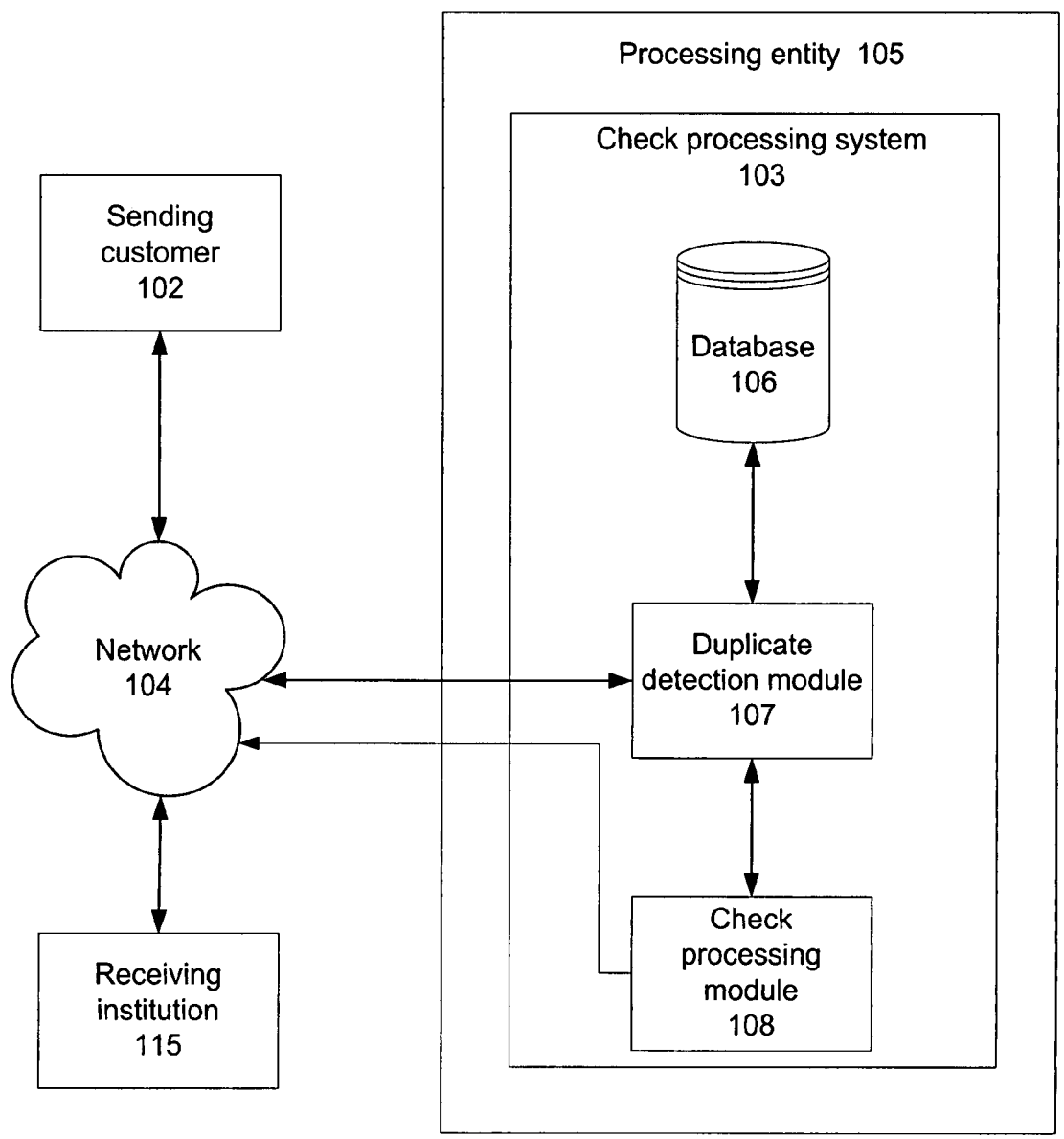
FIG. 1 is a block diagram depicting a system for preventing duplicative electronic check processing, in accordance with certain exemplary embodiments of the invention.

FIG. 1 is a block diagram depicting a system 100 for preventing duplicative electronic check processing, in accordance with certain exemplary embodiments of the invention. The system 100 is described below with reference to the methods illustrated in FIGS. 2 and 3.

Figure 2A:
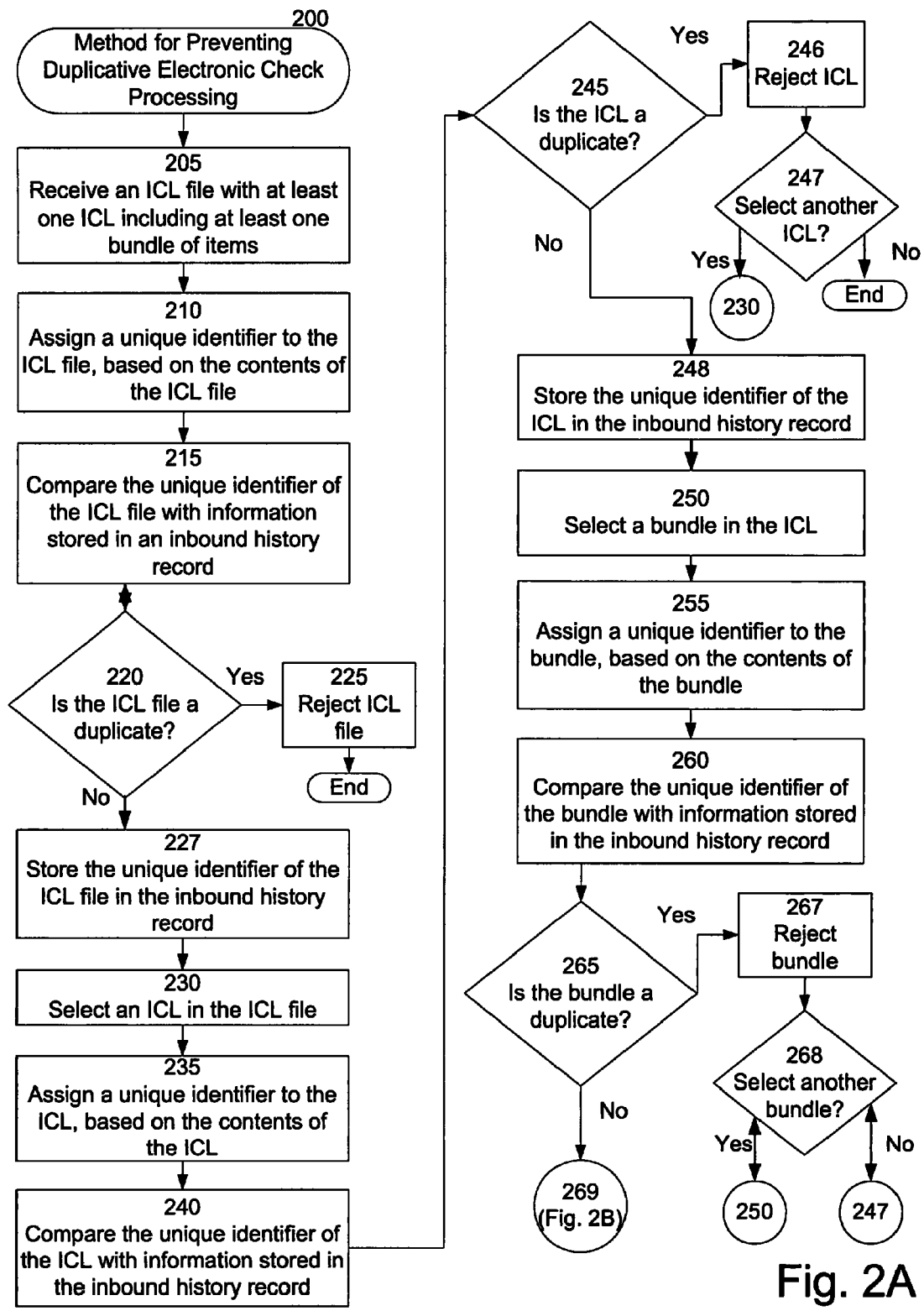
FIGS. 2A and 2B, is a flow chart depicting a method for preventing duplicative electronic check processing, according to certain exemplary embodiments of the invention.
Figure 2B:
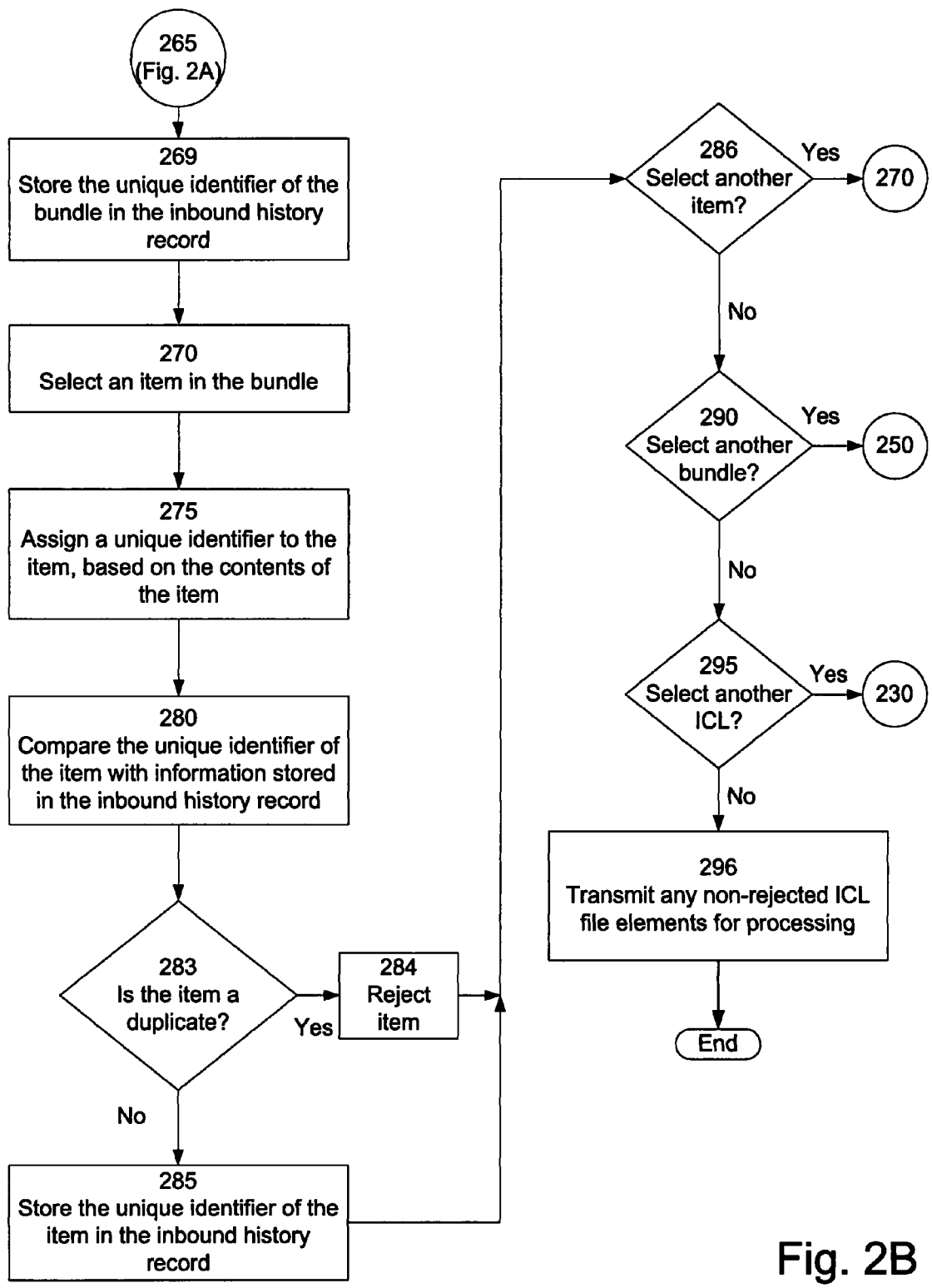

FIG. 2, including FIGS. 2A and 2B, is a flow chart depicting a method 200 for preventing duplicative electronic check processing, according to certain exemplary embodiments of the invention. The exemplary method 200 is illustrative and, in alternative embodiments of the invention, certain steps can be performed in a different order, in parallel with one another, or omitted entirely, and/or certain additional steps can be performed without departing from the scope and spirit of the invention. The method 200 is described below with reference to FIGS. 1 and 2.

In step 205, a check processing system 103 of a processing entity 105 receives an ICL file from a sending customer 102. For example, the customer 102 can submit the ICL file to the check processing system 103 for electronic check payment and/or presentment processing services. The ICL file is an electronic file that includes at least one ICL. For example, each ICL can be an electronic file that complies with the ANSI X9.37/X9.100 standard, or other appropriate industry standards, as may change from time to time. Each ICL includes one or more bundles of items (checks and/or IRDs) to be processed. For a particular item, the ICL can include one or more electronic images of the item, all of the complete MICR data provided on the item, and addenda data of the item.

The ICL also can include a series of records related to the items. For example, for each bundle of items in the ICL, the ICL can include a bundle summary control record including information about the bundle, such as a bundle identification number, the number of items in the bundle, the value of each of the items in the bundle, and the total value of all the items in the bundle. The ICL also can include an ICL control record containing information about the origin and destination of the ICL, and a cash letter bundle summary control record containing a summary of all the bundle summary control records in the ICL.

In certain embodiments of the invention, the ICL file also can include a file header including information identifying the customer 102, such as a name of the customer 102 and/or a bank routing number of the customer 102. The file header also can include information regarding a creation date of the ICL file and information regarding whether each item in the ICL file is associated with a forward transaction or a return transaction.

For example, the customer 102 can submit the ICL file to the check processing system 103 via a network 104. The network 104 can include any wired or wireless telecommunication means by which computerized devices can exchange data, including for example, a local area network (LAN), a wide area network (WAN), an intranet, an Internet, or any combination thereof. In certain exemplary embodiments, the processing entity 105 can include a Federal Reserve Bank or other check processor that receives transaction items from a depositing institution 102, distributes the items to appropriate receiving institutions 115 or their third party processor(s), and performs settlement functions (crediting and debiting of accounts) for the affected financial institutions.

In step 210, a duplicate detection module 107 of the check processing system 103 assigns a unique identifier to the ICL file received in step 205. The unique identifier includes information related to the contents of the ICL file. For example, the unique identifier can include a hashed value of certain information related to the ICL file, including a byte count of the ICL file and other objective metrics regarding the ICL file, such as a total number of ICLs, bundles, and/or items in the file, and a total value of the ICLs, bundles, and/or items in the file. The unique identifier also can be derived from information within the ICL file, including any information in the file header, records, items, bundles, and/or ICLs within the ICL file.

In certain exemplary embodiments, the unique identifier is predictable and repeatable so that the duplicate detection module 107 will assign the same unique identifier to the same ICL file on separate occasions. Thus, if the same ICL file is submitted to the check processing system 103 for processing two or more times, the duplicate detection module 107 will assign the same unique identifier to the ICL file each time.

In step 215, the duplicate detection module 107 compares the unique identifier assigned to the ICL file in step 210 with information stored in an inbound history record. For example, the inbound history record can be stored in a database 106 of the check processing system 103. The inbound history record includes information uniquely identifying ICL files that already have been received for processing and/or that already have been processed for payment and/or presentment. For example, for each ICL file, the inbound history record can include a unique identifier assigned to the ICL file substantially in accordance with step 210. In certain exemplary embodiments, the inbound history record can include information regarding ICL files that have been received and/or processed within a predetermined time period. For example, the inbound history record can include information regarding ICL files received and/or processed during the last five days. The term "record" is used herein to refer to a set of electronic data, including, without limitation, a table, a file, and a part of a table or file.

In step 220, the duplicate detection module 107 determines whether the ICL file is a duplicate, i.e., whether the ICL file already has been received for processing and/or already has been processed for payment and/or presentment, based on the comparison performed in step 215. For example, if the inbound history record includes information identifying the ICL file, then the duplicate detection module 107 can determine that the ICL file is a duplicate. Similarly, if the inbound history record does not include information identifying the ICL file, then the duplicate detection module 107 can determine that the ICL file is not a duplicate.

If the duplicate detection module 107 determines in step 220 that the ICL file is a duplicate, then the method 200 branches to step 225. In step 225, the duplicate detection module 107 rejects the ICL file for processing. For example, the duplicate detection module 107 can return the ICL file to the sending customer 102 via the network 104, suspend processing of the ICL file, and/or output a notification advising the sending customer 102 and/or an operator of the processing entity 105 that the duplicate ICL file will not be processed. In certain exemplary embodiments, the sending customer 102 and/or operator can override the rejection decision if it determines that the ICL file actually is not a duplicate or otherwise should be reprocessed. From step 225, the method 200 ends. However, if the sending customer 102 and/or operator overrides the rejection decision (not shown in FIG. 2), then the method 200 continues to step 227, which is discussed below.

If the duplicate detection module 107 determines in step 220 that the ICL file is not a duplicate, then the method 200 branches to step 227. In step 227, the duplicate detection module 107 stores information uniquely identifying the ICL file in the inbound history record. For example, the duplicate detection module 107 can store the unique identifier assigned to the ICL file in step 210 in the inbound history record. Thus, if a duplicate of the ICL file is subsequently resubmitted for processing, the duplicate detection module 107 can identify the subsequent ICL file as a duplicate by matching information in the duplicate ICL file and/or a unique identifier associated with the duplicate ICL file with the information stored in the inbound history record.

Having determined in step 220 that the ICL file is not a duplicate, the duplicate detection module 107 next determines whether any elements in the ICL file are duplicates, i.e., already have been processed and/or received for processing. In step 230, the duplicate detection module 107 selects an ICL in the ICL file. In step 235, the duplicate detection module 107 assigns a unique identifier to the selected ICL. The unique identifier includes information related to the contents of the ICL. For example, the unique identifier can include a hashed value of certain information related to the ICL, including a byte count of the ICL and other objective metrics regarding the ICL, such as a total number of bundles and/or items in the ICL and/or a total value of the bundles and/or items in the ICL. The unique identifier also can be derived from information within the ICL, including any information in the records, items, and/or bundles within the ICL.

In certain exemplary embodiments, the unique identifier is predictable and repeatable so that the duplicate detection module 107 will assign the same unique identifier to the same ICL on separate occasions. Thus, if the same ICL is submitted to the check processing system 103 for processing two or more times, the duplicate detection module 107 will assign the same unique identifier to the ICL each time.

In step 240, the duplicate detection module 107 compares the unique identifier of the ICL with information stored in the inbound history record. The inbound history record includes information uniquely identifying ICLs that already have been received for processing and/or that already have been processed for payment and/or presentment. For example, for each ICL, the inbound history record can include a unique identifier assigned to the ICL substantially in accordance with step 235. In certain exemplary embodiments, the inbound history record can include information regarding ICLs that have been received and/or processed within a predetermined time period. For example, the inbound history record can include information regarding ICLs received and/or processed during the last five days. In certain alternative exemplary embodiments, the duplicate detection module 107 can consult and/or maintain separate inbound history records for ICL files and ICLs.

In step 245, the duplicate detection module 107 determines whether the ICL is a duplicate, i.e., whether the ICL already has been received for processing and/or already has been processed for payment and/or presentment, based on the comparison performed in step 240. For example, if the inbound history record includes information identifying the ICL, then the duplicate detection module 107 can determine that the ICL is a duplicate. Similarly, if the inbound history record does not include information identifying the ICL, then the duplicate detection module 107 can determine that the ICL is not a duplicate.

If the duplicate detection module 107 determines in step 245 that the ICL is a duplicate, then the method 200 branches to step 246. In step 246, the duplicate detection module 107 rejects the ICL for processing. For example, the duplicate detection module 107 can return the ICL to the sending customer 102 via the network 104, suspend processing of the ICL, and/or output a notification advising the sending customer 102 and/or an operator of the processing entity 105 that the duplicate ICL will not be processed. In certain exemplary embodiments, the sending customer 102 and/or operator can override the rejection decision if it determines that the ICL actually is not a duplicate or otherwise should be reprocessed. The method 200 then continues to step 247 discussed below. However, if the sending customer 102 and/or operator overrides the rejection decision (not shown in FIG. 2), then the method 200 continues to step 248 discussed below, rather than step 247.

In step 247, the duplicate detection module 107 determines whether to select another ICL in the ICL file for review. If so, the method 200, branches back to step 230 to repeat the selection and analysis of another ICL. If not, then the method 200 ends.

If the duplicate detection module 107 determines in step 245 that the ICL is not a duplicate, then the method 200 branches to step 248. In step 248, the duplicate detection module 107 stores information uniquely identifying the ICL in the inbound history record. For example, the duplicate detection module 107 can store the unique identifier assigned to the ICL in step 235 in the inbound history record. Thus, if a duplicate of the ICL is subsequently resubmitted for processing, the duplicate detection module 107 can identify the subsequent ICL as a duplicate by matching information in the duplicate ICL and/or a unique identifier associated with the duplicate ICL with the information stored in the inbound history record.

Having determined in step 245 that the ICL is not a duplicate, the duplicate detection module 107 next determines whether any elements in the ICL are duplicates, i.e., already have been processed and/or received for processing. In step 250, the duplicate detection module 107 selects a bundle of items in the ICL. In step 255, the duplicate detection module 107 assigns a unique identifier to the selected bundle. The unique identifier includes information related to the contents of the bundle. For example, the unique identifier can include a hashed value of certain information related to the bundle, including a byte count of the bundle and other objective metrics regarding the bundle, such as a total number of items in the bundle and/or a total value of the items in the bundle. The unique identifier also can be derived from information within the bundle, including any information in the items within the bundle.

In certain exemplary embodiments, the unique identifier is predictable and repeatable so that the duplicate detection module 107 will assign the same unique identifier to the same bundle on separate occasions. Thus, if the same bundle is submitted to the check processing system 103 for processing two or more times, the duplicate detection module 107 will assign the same unique identifier to the bundle each time.

In step 260, the duplicate detection module 107 compares the unique identifier of the bundle with information stored in the inbound history record. The inbound history record includes information uniquely identifying bundles that already have been received for processing and/or that already have been processed for payment and/or presentment. For example, for each bundle, the inbound history record can include a unique identifier assigned to the bundle substantially in accordance with step 255. In certain exemplary embodiments, the inbound history record can include information regarding bundles that have been received and/or processed within a predetermined time period. For example, the inbound history record can include information regarding bundles received and/or processed during the last five days. In certain alternative exemplary embodiments, the duplicate detection module 107 can consult and/or maintain separate inbound history records for ICL files, ICLs, and/or bundles.

In step 265, the duplicate detection module 107 determines whether the bundle is a duplicate, i.e., whether the bundle already has been received for processing and/or already has been processed for payment and/or presentment, based on the comparison performed in step 260. For example, if the inbound history record includes information identifying the bundle, then the duplicate detection module 107 can determine that the bundle is a duplicate. Similarly, if the inbound history record does not include information identifying the bundle, then the duplicate detection module 107 can determine that the bundle is not a duplicate.

If the duplicate detection module 107 determines in step 265 that the bundle is a duplicate, then the method 200 branches to step 267. In step 267, the duplicate detection module 107 rejects the bundle for processing. For example, the duplicate detection module 107 can return the bundle to the sending customer 102 via the network 104, suspend processing of the bundle, and/or output a notification advising the sending customer 102 and/or an operator of the processing entity 105 that the duplicate bundle will not be processed. In certain exemplary embodiments, the sending customer 102 and/or operator can override the rejection decision if it determines that the bundle actually is not a duplicate or otherwise should be reprocessed. The method 200 then continues to step 268 discussed below. However, if the sending customer 102 and/or operator overrides the rejection decision (not shown in FIG. 2), then the method 200 continues to step 269 discussed below, rather than to step 268.

In step 268, the duplicate detection module 107 determines whether to select another bundle in the ICL for review. If so, the method 200, branches back to step 250 to repeat the selection and analysis of another bundle. If not, then the method 200 branches back to step 247 discussed above.

If the duplicate detection module 107 determines in step 265 that the bundle is not a duplicate, then the method 200 branches to step 269. In step 269, the duplicate detection module 107 stores information uniquely identifying the bundle in the inbound history record. For example, the duplicate detection module 107 can store the unique identifier assigned to the bundle in step 255 in the inbound history record. Thus, if a duplicate of the bundle is subsequently resubmitted for processing, the duplicate detection module 107 can identify the subsequent bundle as a duplicate by matching information in the duplicate bundle and/or a unique identifier associated with the duplicate bundle with the information stored in the inbound history record.

Having determined in step 265 that the bundle is not a duplicate, the duplicate detection module 107 next determines whether any items in the bundle are duplicates, i.e., already have been processed and/or received for processing. In step 270, the duplicate detection module 107 selects an item in the bundle. In step 275, the duplicate detection module 107 assigns a unique identifier to the selected item. The unique identifier includes information related to the contents of the item. For example, the unique identifier can include a hashed value of certain information related to the item, including a byte count of the item and other objective metrics regarding the item, such as a total value of the item and/or certain MICR and/or addenda data from the item.

In certain exemplary embodiments, the unique identifier is predictable and repeatable so that the duplicate detection module 107 will assign the same unique identifier to the same item on separate occasions. Thus, if the same item is submitted to the check processing system 103 for processing two or more times, the duplicate detection module 107 will assign the same unique identifier to the item each time.

In step 280, the duplicate detection module 107 compares the unique identifier of the item with information stored in the inbound history record. The inbound history record includes information uniquely identifying items that already have been received for processing and/or that already have been processed for payment and/or presentment. For example, for each item, the inbound history record can include a unique identifier assigned to the item substantially in accordance with step 275. In certain exemplary embodiments, the inbound history record can include information regarding items that have been received and/or processed within a predetermined time period. For example, the inbound history record can include information regarding items received and/or processed during the last five days. In certain alternative exemplary embodiments, the duplicate detection module 107 can consult and/or maintain separate inbound history records for ICL files, ICLs, bundles, and/or items.

In step 283, the duplicate detection module 107 determines whether the item is a duplicate, i.e., whether the item already has been received for processing and/or already has been processed for payment and/or presentment, based on the comparison performed in step 280. For example, if the inbound history record includes information identifying the item, then the duplicate detection module 107 can determine that the item is a duplicate. Similarly, if the inbound history record does not include information identifying the item, then the duplicate detection module 107 can determine that the item is not a duplicate.

If the duplicate detection module 107 determines in step 283 that the item is a duplicate, then the method 200 branches to step 284. In step 284, the duplicate detection module 107 rejects the item for processing. For example, the duplicate detection module 107 can return the item to the sending customer 102 via the network 104, suspend processing of the item, and/or output a notification advising the sending customer 102 and/or an operator of the processing entity 105 that the duplicate item will not be processed. In certain exemplary embodiments, the sending customer 102 and/or operator can override the rejection decision if it determines that the item actually is not a duplicate or otherwise should be reprocessed. The method 200 then continues to step 286, which is discussed below. However, if the sending customer 102 and/or operator overrides the rejection decision (not shown in FIG. 2), then the method 200 continues to step 285 discussed below, rather than step 286.

If the duplicate detection module 107 determines in step 283 that the item is not a duplicate, then the method 200 branches to step 285. In step 285, the duplicate detection module 107 stores information uniquely identifying the item in the inbound history record. For example, the duplicate detection module 107 can store the unique identifier assigned to the item in step 275 in the inbound history record. Thus, if a duplicate of the item is subsequently resubmitted for processing, the duplicate detection module 107 can identify the subsequent item as a duplicate by matching information in the duplicate item and/or a unique identifier associated with the duplicate item with the information stored in the inbound history record. The method 200 then proceeds to step 286.

In step 286, the duplicate detection module 107 determines whether to select another item in the bundle for review. If so, then the method 200, branches back to step 270 to repeat the selection and analysis of another item. If the duplicate detection module 107 determines in step 286 not to select another item for review, then the method 200 branches to step 290, where the duplicate detection module 107 determines whether to select another bundle in the ICL for review. If so, then the method 200, branches back to step 250 to repeat the selection and analysis of another bundle. If the duplicate detection module 107 determines in step 290 not to select another bundle for review, then the method 200 branches to step 295, where the duplicate detection module 107 determines whether to select another ICL in the ICL file for review. If so, then the method 200, branches back to step 230 to repeat the selection and analysis of another ICL. If the duplicate detection module 107 determines in step 295 not to select another ICL, then the method 200 branches to step 296.

In step 296, the duplicate detection module 107 transmits any non-rejected ICL file elements to a check processing module 108 of the check processing system 103 for processing. For example, the check processing module 108 can process certain non-duplicate items for payment and/or presentment. Certain exemplary methods for performing such processing are described in co-pending U.S. patent application Ser. No. 11/362,344, entitled "Cash Letter Print Streams With Audit Data" and U.S. patent application Ser. No. 11/362,343, entitled "Expanded Mass Data Sets for Electronic Check Processing," the complete disclosures of which are hereby fully incorporated herein by reference.

In certain exemplary embodiments, the duplicate detection module 107 can transmit a report regarding the rejected and/or non-rejected ICL file elements to the sending customer 102. For example, the report can include information identifying whether each element of the ICL file is a duplicate and/or whether each ICL file element has been processed by the check processing module 108. The duplicate detection module 107 can print a hard copy of the report for mailing to the customer 102 and/or electronically transmit a copy of the report to the customer via email, a secure web site, or other suitable electronic means. The duplicate detection module 107 also can return each duplicate ICL file element not processed by the check processing module 108 to the sending customer 102 for reference in reviewing the report and/or for re-submission in the event that any of the ICL file elements ultimately are determined not to be duplicates.

In certain alternative exemplary embodiments, the duplicate detection module 107 can review the ICL file and all ICL file elements therein to determine whether each ICL file element is a duplicate prior to rejecting any duplicate ICL file elements. For example, after reviewing the ICL file and all ICL file elements therein, the duplicate detection module 107 can reject all duplicate ICL file elements and generate a report listing all rejected ICL file elements. The duplicate detection module 107 can suspend processing of the rejected ICL file elements and/or output the report to the sending customer 102 and/or an operator of the processing entity 105. For example, the sending customer 102 and/or operator can override one or more of the rejection decisions if it determines that the ICL file and/or one or more of the ICL elements actually are not duplicates or otherwise should be reprocessed.

Figure 3A:
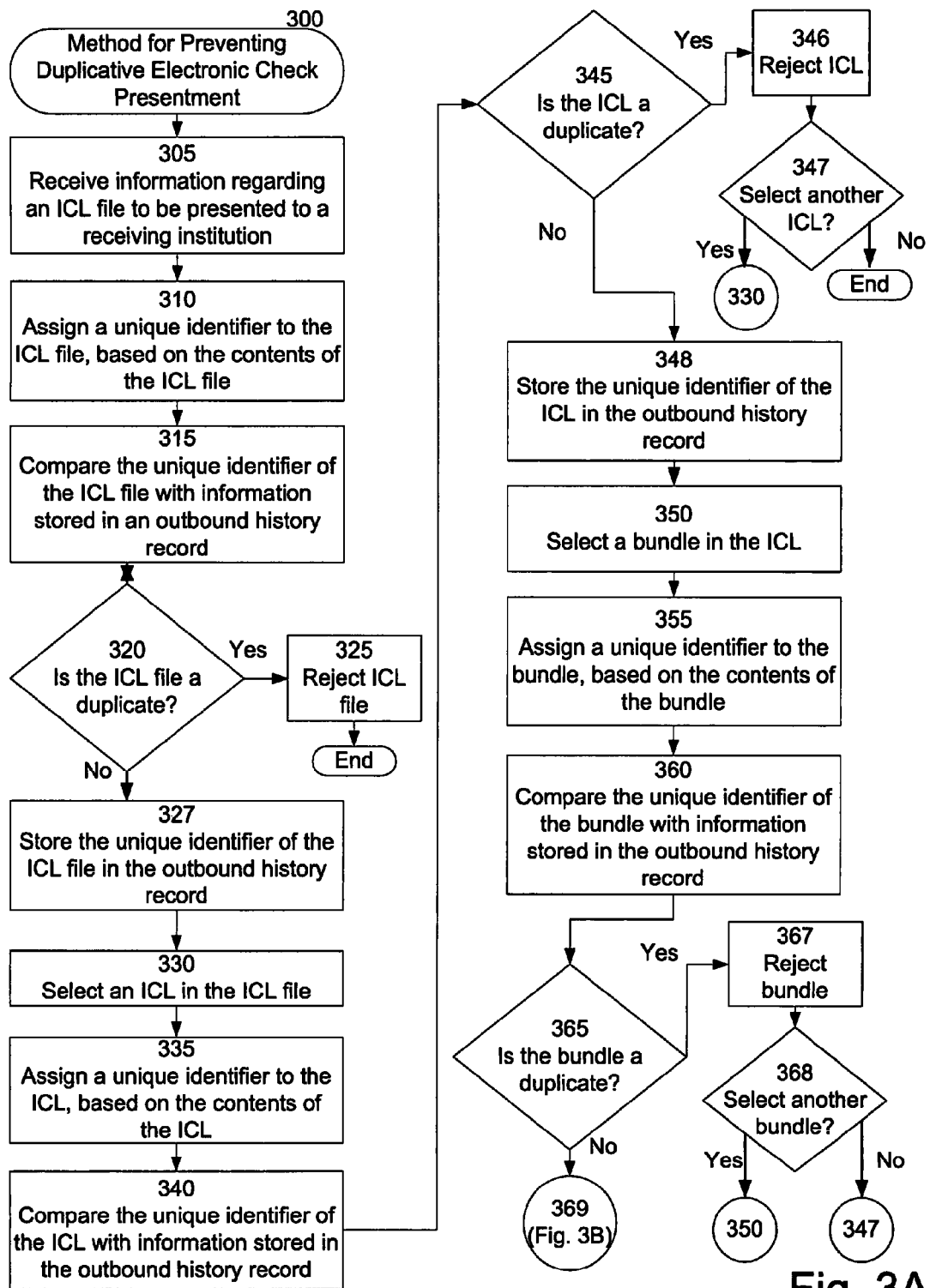
FIGS. 3A and 3B, is a flow chart depicting a method for preventing duplicative electronic check presentment, according to certain exemplary embodiments of the invention.
Figure 3B:
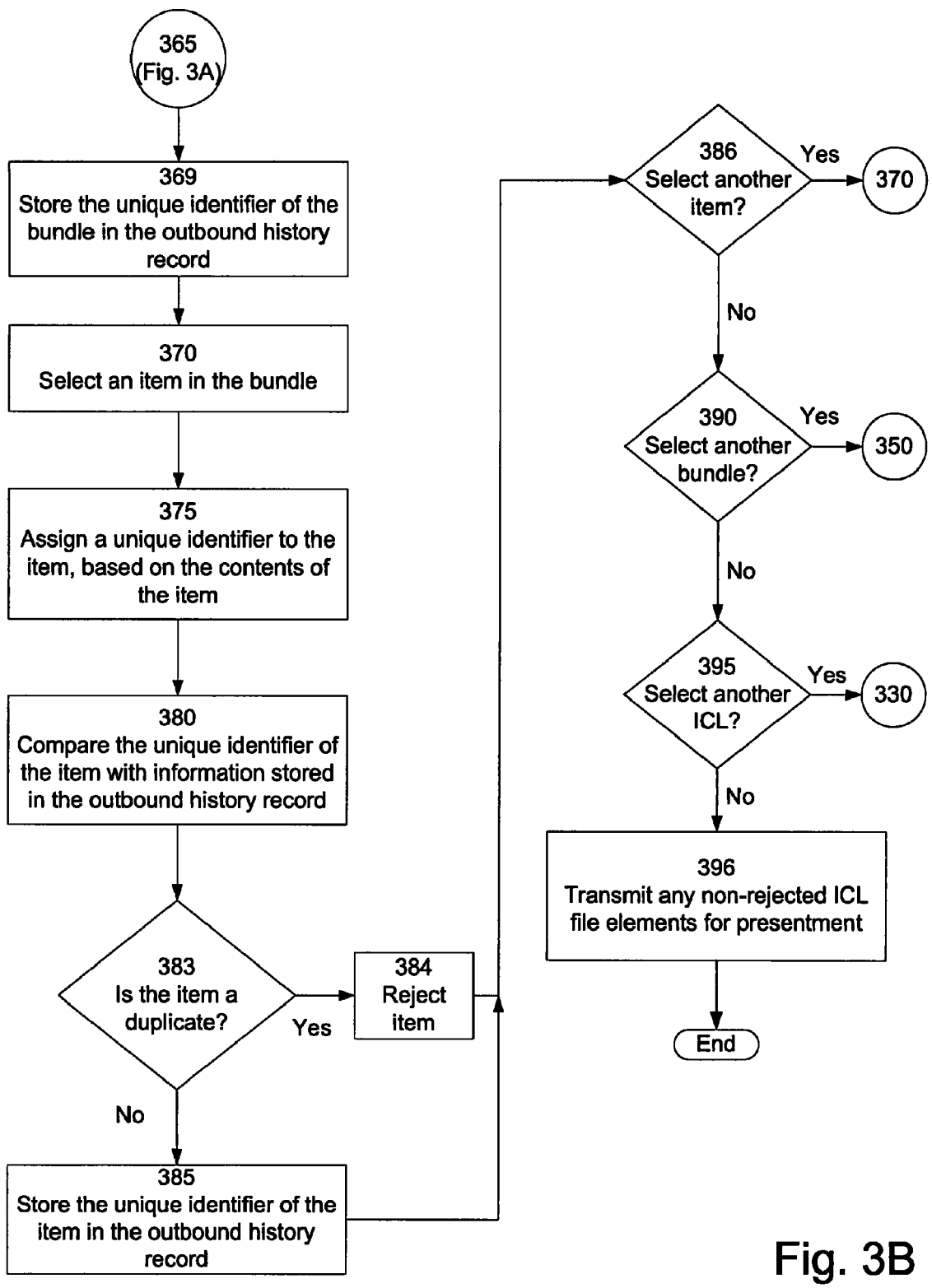

FIG. 3, including FIGS. 3A and 3B, is a flow chart depicting a method 300 for preventing duplicative electronic check presentment, according to certain exemplary embodiments of the invention. The exemplary method 300 is illustrative and, in alternative embodiments of the invention, certain steps can be performed in a different order, in parallel with one another, or omitted entirely, and/or certain additional steps can be performed without departing from the scope and spirit of the invention. The method 300 is described below with reference to FIGS. 1 and 3.

In step 305, the duplicate detection module 107 receives information from the check processing module 108 regarding an ICL file to be presented to a receiving institution 115. For example, the ICL file can be presented electronically or via paper, substantially as described in co-pending U.S. patent application Ser. No. 11/362,344, entitled "Cash Letter Print Streams With Audit Data," the complete disclosures of which is hereby fully incorporated herein by reference. In the method 300, the duplicate detection module 107 ensures that the ICL file and the ICL file elements contained therein have not already been presented for payment.

In step 310, the duplicate detection module 107 assigns a unique identifier to the ICL file identified in step 305. The unique identifier includes information related to the contents of the ICL file. For example, the unique identifier can include a hashed value of certain information related to the ICL file, including a byte count of the ICL file and other objective metrics regarding the ICL file, such as a total number of ICLs, bundles, and/or items in the file, and a total value of the ICLs, bundles, and/or items in the file. The unique identifier also can be derived from information within the ICL file, including any information in the file header, records, items, bundles, and/or ICLs within the ICL file.

In certain exemplary embodiments, the unique identifier is predictable and repeatable so that the duplicate detection module 107 will assign the same unique identifier to the same ICL file on separate occasions. Thus, if the same ICL file is identified by the check processing module 108 for presentment two or more times, the duplicate detection module 107 will assign the same unique identifier to the ICL file each time.

In step 315, the duplicate detection module 107 compares the unique identifier assigned to the ICL file in step 310 with information stored in an outbound history record. For example, the outbound history record can be stored in the database 106 of the check processing system 103. The outbound history record includes information uniquely identifying ICL files that already have been identified and/or processed for presentment. For example, for each ICL file, the outbound history record can include a unique identifier assigned to the ICL file substantially in accordance with step 310. In certain exemplary embodiments, the outbound history record can include information regarding ICL files that have been identified and/or processed within a predetermined time period. For example, the outbound history record can include information regarding ICL files identified and/or processed during the last five days.

In step 320, the duplicate detection module 107 determines whether the ICL file is a duplicate, i.e., whether the ICL file already has been identified and/or processed for presentment, based on the comparison performed in step 315. For example, if the outbound history record includes information identifying the ICL file, then the duplicate detection module 107 can determine that the ICL file is a duplicate. Similarly, if the outbound history record does not include information identifying the ICL file, then the duplicate detection module 107 can determine that the ICL file is not a duplicate.

If the duplicate detection module 107 determines in step 320 that the ICL file is a duplicate, then the method 300 branches to step 325. In step 325, the duplicate detection module 107 rejects the ICL file for presentment. For example, the duplicate detection module 107 can suspend processing of the ICL file and/or output a notification advising an operator of the processing entity 105 that the duplicate ICL file will not be presented. In certain exemplary embodiments, the operator can override this decision if the operator determines that the ICL file actually is not a duplicate or otherwise should be presented again.

If the duplicate detection module 107 determines in step 320 that the ICL file is not a duplicate, then the method 300 branches to step 327. In step 327, the duplicate detection module 107 stores information uniquely identifying the ICL file in the outbound history record. For example, the duplicate detection module 107 can store the unique identifier assigned to the ICL file in step 310 in the outbound history record. Thus, if a duplicate of the ICL file is subsequently resubmitted for presentment, the duplicate detection module 107 can identify the subsequent ICL file as a duplicate by matching information in the duplicate ICL file and/or a unique identifier associated with the duplicate ICL file with the information stored in the outbound history record.

Having determined in step 320 that the ICL file is not a duplicate, the duplicate detection module 107 next determines whether any elements in the ICL file are duplicates, i.e., already have been identified and/or processed for presentment. In step 330, the duplicate detection module 107 selects an ICL in the ICL file. In step 335, the duplicate detection module 107 assigns a unique identifier to the selected ICL. The unique identifier includes information related to the contents of the ICL. For example, the unique identifier can include a hashed value of certain information related to the ICL, including a byte count of the ICL and other objective metrics regarding the ICL, such as a total number of bundles and/or items in the ICL and/or a total value of the bundles and/or items in the ICL. The unique identifier also can be derived from information within the ICL, including any information in the records, items, and/or bundles within the ICL.

In certain exemplary embodiments, the unique identifier is predictable and repeatable so that the duplicate detection module 107 will assign the same unique identifier to the same ICL on separate occasions. Thus, if the same ICL is identified by the check processing module 108 for presentment two or more times, the duplicate detection module 107 will assign the same unique identifier to the ICL each time.

In step 340, the duplicate detection module 107 compares the unique identifier of the ICL with information stored in the outbound history record. The outbound history record includes information uniquely identifying ICLs that already have been identified and/or processed for presentment. For example, for each ICL, the outbound history record can include a unique identifier assigned to the ICL substantially in accordance with step 335. In certain exemplary embodiments, the outbound history record can include information regarding ICLs that have been identified and/or processed within a predetermined time period. For example, the outbound history record can include information regarding ICLs identified and/or processed during the last five days. In certain alternative exemplary embodiments, the duplicate detection module 107 can consult and/or maintain separate outbound history records for ICL files and ICLs.

In step 345, the duplicate detection module 107 determines whether the ICL is a duplicate, i.e., whether the ICL already has been identified and/or processed for presentment, based on the comparison performed in step 340. For example, if the outbound history record includes information identifying the ICL, then the duplicate detection module 107 can determine that the ICL is a duplicate. Similarly, if the outbound history record does not include information identifying the ICL, then the duplicate detection module 107 can determine that the ICL is not a duplicate.

If the duplicate detection module 107 determines in step 345 that the ICL is a duplicate, then the method 300 branches to step 346. In step 346, the duplicate detection module 107 rejects the ICL for presentment. For example, the duplicate detection module 107 can suspend processing of the ICL and/or output a notification advising the operator of the processing entity 105 that the duplicate ICL will not be processed. In certain exemplary embodiments, the operator can override the rejection decision if it determines that the ICL actually is not a duplicate or otherwise should be reprocessed.

In step 347, the duplicate detection module 107 determines whether to select another ICL in the ICL file for review. If so, the method 300, branches back to step 330 to repeat the selection and analysis of another ICL. If not, then the method 300 ends.

If the duplicate detection module 107 determines in step 345 that the ICL is not a duplicate, then the method 300 branches to step 348. In step 348, the duplicate detection module 107 stores information uniquely identifying the ICL in the outbound history record. For example, the duplicate detection module 107 can store the unique identifier assigned to the ICL in step 335 in the outbound history record. Thus, if a duplicate of the ICL is subsequently resubmitted for presentment, the duplicate detection module 107 can identify the subsequent ICL as a duplicate by matching information in the duplicate ICL and/or a unique identifier associated with the duplicate ICL with the information stored in the outbound history record.

Having determined in step 345 that the ICL is not a duplicate, the duplicate detection module 107 next determines whether any elements in the ICL are duplicates, i.e., already have been identified and/or processed for presentment. In step 350, the duplicate detection module 107 selects a bundle of items in the ICL. In step 355, the duplicate detection module 107 assigns a unique identifier to the selected bundle. The unique identifier includes information related to the contents of the bundle. For example, the unique identifier can include a hashed value of certain information related to the bundle, including a byte count of the bundle and other objective metrics regarding the bundle, such as a total number of items in the bundle and/or a total value of the items in the bundle. The unique identifier also can be derived from information within the bundle, including any information in the items within the bundle.

In certain exemplary embodiments, the unique identifier is predictable and repeatable so that the duplicate detection module 107 will assign the same unique identifier to the same bundle on separate occasions. Thus, if the same bundle is identified by the check processing module 108 for presentment two or more times, the duplicate detection module 107 will assign the same unique identifier to the bundle each time.

In step 360, the duplicate detection module 107 compares the unique identifier of the bundle with information stored in the outbound history record. The outbound history record includes information uniquely identifying bundles that already have been identified and/or processed for presentment. For example, for each bundle, the outbound history record can include a unique identifier assigned to the bundle substantially in accordance with step 355. In certain exemplary embodiments, the outbound history record can include information regarding bundles that have been identified and/or processed within a predetermined time period. For example, the outbound history record can include information regarding bundles identified and/or processed during the last five days. In certain alternative exemplary embodiments, the duplicate detection module 107 can consult and/or maintain separate outbound history records for ICL files, ICLs, and/or bundles.

In step 365, the duplicate detection module 107 determines whether the bundle is a duplicate, i.e., whether the bundle already has been identified and/or processed for presentment, based on the comparison performed in step 360. For example, if the outbound history record includes information identifying the bundle, then the duplicate detection module 107 can determine that the bundle is a duplicate. Similarly, if the outbound history record does not include information identifying the bundle, then the duplicate detection module 107 can determine that the bundle is not a duplicate.

If the duplicate detection module 107 determines in step 365 that the bundle is a duplicate, then the method 300 branches to step 367. In step 367, the duplicate detection module 107 rejects the bundle for processing. For example, the duplicate detection module 107 can suspend processing of the bundle and/or output a notification advising the operator of the processing entity 105 that the duplicate bundle will not be processed. In certain exemplary embodiments, operator can override the rejection decision if it determines that the bundle actually is not a duplicate or otherwise should be reprocessed.

In step 368, the duplicate detection module 107 determines whether to select another bundle in the ICL for review. If so, the method 300, branches back to step 350 to repeat the selection and analysis of another bundle. If not, then the method 300 branches back to step 347 discussed above.

If the duplicate detection module 107 determines in step 365 that the bundle is not a duplicate, then the method 300 branches to step 369. In step 369, the duplicate detection module 107 stores information uniquely identifying the bundle in the outbound history record. For example, the duplicate detection module 107 can store the unique identifier assigned to the bundle in step 355 in the outbound history record. Thus, if a duplicate of the bundle is subsequently resubmitted for presentment, the duplicate detection module 107 can identify the subsequent bundle as a duplicate by matching information in the duplicate bundle and/or a unique identifier associated with the duplicate bundle with the information stored in the outbound history record.

Having determined in step 365 that the bundle is not a duplicate, the duplicate detection module 107 next determines whether any items in the bundle are duplicates, i.e., already have been identified and/or processed for presentment. In step 370, the duplicate detection module 107 selects an item in the bundle. In step 375, the duplicate detection module 107 assigns a unique identifier to the selected item. The unique identifier includes information related to the contents of the item. For example, the unique identifier can include a hashed value of certain information related to the item, including a byte count of the item and other objective metrics regarding the item, such as a total value of the item and/or certain MICR and/or addenda data from the item.

In certain exemplary embodiments, the unique identifier is predictable and repeatable so that the duplicate detection module 107 will assign the same unique identifier to the same item on separate occasions. Thus, if the same item is identified by the check processing module 108 for presentment two or more times, the duplicate detection module 107 will assign the same unique identifier to the item each time.

In step 380, the duplicate detection module 107 compares the unique identifier of the item with information stored in the outbound history record. The outbound history record includes information uniquely identifying items that already have been identified and/or processed for presentment. For example, for each item, the outbound history record can include a unique identifier assigned to the item substantially in accordance with step 375. In certain exemplary embodiments, the outbound history record can include information regarding items that have been identified and/or processed within a predetermined time period. For example, the outbound history record can include information regarding items identified and/or processed during the last five days. In certain alternative exemplary embodiments, the duplicate detection module 107 can consult and/or maintain separate outbound history records for ICL files, ICLs, bundles, and/or items.

In step 383, the duplicate detection module 107 determines whether the item is a duplicate, i.e., whether the item already has been identified and/or processed for presentment, based on the comparison performed in step 380. For example, if the outbound history record includes information identifying the item, then the duplicate detection module 107 can determine that the item is a duplicate. Similarly, if the outbound history record does not include information identifying the item, then the duplicate detection module 107 can determine that the item is not a duplicate.

If the duplicate detection module 107 determines in step 383 that the item is a duplicate, then the method 300 branches to step 384. In step 384, the duplicate detection module 107 rejects the item for processing. For example, the duplicate detection module 107 can suspend processing of the item and/or output a notification advising the operator of the processing entity 105 that the duplicate item will not be processed. In certain exemplary embodiments, the operator can override the rejection decision if it determines that the item actually is not a duplicate or otherwise should be reprocessed. The method 300 branches to step 386, which is discussed below.

If the duplicate detection module 107 determines in step 383 that the item is not a duplicate, then the method 300 branches to step 385. In step 385, the duplicate detection module 107 stores information uniquely identifying the item in the outbound history record. For example, the duplicate detection module 107 can store the unique identifier assigned to the item in step 275 in the outbound history record. Thus, if a duplicate of the item is subsequently resubmitted for presentment, the duplicate detection module 107 can identify the item as a duplicate by matching information in the duplicate item and/or a unique identifier associated with the duplicate item with the information stored in the inbound history record. The method 300 then proceeds to step 386.

In step 386, the duplicate detection module 107 determines whether to select another item in the bundle for review. If so, then the method 300, branches back to step 370 to repeat the selection and analysis of another item. If the duplicate detection module 107 determines in step 386 not to select another item for review, then the method 300 branches to step 390, where the duplicate detection module 107 determines whether to select another bundle in the ICL for review. If so, then the method 300, branches back to step 350 to repeat the selection and analysis of another bundle. If the duplicate detection module 107 determines in step 390 not to select another bundle, then the method 300 branches to step 395, where the duplicate detection module 107 determines whether to select another ICL in the ICL file for review. If so, then the method 300, branches back to step 330 to repeat the selection and analysis of another ICL. If the duplicate detection module 107 determines in step 395 not to select another ICL, then the method 300 branches to step 396.

In step 396, the duplicate detection module 107 transmits any non-rejected ICL file elements to the check processing module 108 for presentment. In certain exemplary embodiments, the duplicate detection module 107 can transmit a report regarding the rejected and/or non-rejected ICL file elements to the operator of the processing entity 105. For example, the report can include information identifying whether each element of the ICL file is a duplicate and/or whether each ICL file element has been submitted for presentment by the check processing module 108. The duplicate detection module 107 can return each duplicate ICL file element not submitted for presentment by the check processing module 108 to the operator for reference in reviewing the report and/or for re-submission in the event that any of the ICL file elements ultimately are determined not to be duplicates or that any of the duplicate ICL file elements nevertheless should be processed.

The invention can be used with computer hardware and software that performs the methods and processing functions described above. As will be appreciated by a person skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person skilled in the art without departing from the spirit and scope of the present invention defined in the following claims, the scope of which is to be accorded the broadest interpretation so as to encompass such modifications and equivalent structures.

We claim:

1. A computer-implemented method for preventing duplicative electronic check processing, comprising the steps of:
    assigning, by a duplicate detection module, a unique identifier to at least a portion of an image cash letter ("ICL") file based upon information associated with the ICL file;
    determining, by the duplicate detection module, whether the at least a portion of the ICL file is a duplicate by comparing the unique identifier assigned to the at least a portion of the ICL file with information stored in a record;
    in response to determining that the at least a portion of the ICL file is a duplicate, determining, by the duplicate detection module, not to process the at least a portion of the ICL file for at least one of payment and presentment; and
    in response to determining that the at least a portion of the ICL file is not a duplicate, assigning, by the duplicate detection module, a unique identifier to at least one element of the at least a portion of the ICL file based upon information associated with the at least one element of the ICL file,
    wherein the duplicate detection module is implemented in a computer system that comprises instructions stored in a machine-readable medium and a processor that executes the instructions.

2. The method of claim 1, wherein the at least a portion of the ICL file comprises the entire ICL file.

3. The method of claim 1, wherein the at least a portion of the ICL file comprises at least one of an ICL, an item bundle, and an item of the ICL file.

4. The method of claim 1, wherein the unique identifier comprises information derived from information within the ICL file.

5. The method of claim 1, wherein the unique identifier comprises at least one objective metric of the at least a portion of the ICL file.

6. The method of claim 5, wherein the objective metric comprises a byte count of the at least a portion of the ICL file.

7. The method of claim 1, further comprising the steps of:
    determining, by the duplicate detection module, whether the at least one element is a duplicate by comparing the unique identifier assigned to the at least one element with information stored in the record; and
    in response to determining that the at least one element is not a duplicate, storing the unique identifier assigned to the at least one element in the record.

8. The method of claim 1, wherein the duplicate detection module determines that the at least a portion of the ICL file is a duplicate if the information stored in the record includes the unique identifier assigned to the at least a portion of the ICL file.

9. The method of claim 1, wherein the unique identifier comprises hashed information related to the at least a portion of the ICL file.

10. The method of claim 9, wherein the hashed information comprises at least one of a byte count of the ICL file, a total number of ICL's in the ICL file, a total number of bundles in the ICL file, a total number of items in the ICL file, and a total dollar value of the items in the ICL file.

11. The method of claim 9, wherein the hashed information comprises at least two of a byte count of the ICL file, a total number of ICL's in the ICL file, a total number of bundles in the ICL file, a total number of items in the ICL file, and a total dollar value of the items in the ICL file.

12. A computer-implemented method for preventing duplicative electronic check processing, comprising the steps of:
assigning, by a duplicate detection module, a unique identifier to an image cash letter ("ICL") based upon information associated with the ICL;
determining, by the duplicate detection module, whether the ICL is a duplicate by comparing the unique identifier assigned to the ICL with information stored in a record;
in response to determining that the ICL is a duplicate, determining, by the duplicate detection module, not to process the ICL for at least one of payment and presentment; and
in response to determining that the ICL is not a duplicate, assigning, by the duplicate detection module, a unique identifier to at least one element of the ICL based upon information associated with the at least one element of the ICL,
wherein the duplicate detection module is implemented in a computer system that comprises instructions stored in a machine-readable medium and a processor that executes the instructions.

13. The method of claim 12, wherein the unique identifier comprises information derived from information within the ICL.

14. The method of claim 12, wherein the unique identifier comprises at least one objective metric of the ICL.

15. The method of claim 14, wherein the objective metric comprises a byte count of the ICL.

16. The method of claim 12, further comprising the steps of:
determining, by the duplicate detection module, whether the at least one element of the ICL is a duplicate by comparing the unique identifier assigned to the at least one element of the ICL with information stored in the record; and
in response to determining that the at least one element of the ICL is not a duplicate, storing the unique identifier assigned to the at least one element of the ICL in the record.

17. The method of claim 12, wherein
the at least one element of the ICL comprises an item bundle of the ICL and the method further comprises:
determining, by the duplicate detection module, whether the item bundle is a duplicate by comparing the unique identifier assigned to the item bundle with information stored in the record; and
in response to determining that the item bundle is a duplicate, determining, by the duplicate detection module, not to process the item bundle for at least one of payment and presentment.

18. The method of claim 17, further comprising the steps of:
in response to determining that the item bundle ICL is not a duplicate,
assigning, by the duplicate detection module, a unique identifier to an item of the item bundle based upon information associated with the item of the item bundle;
determining, by the duplicate detection module, whether the item is a duplicate by comparing the unique identifier assigned to the item with information stored in the record; and
in response to determining that the item is a duplicate, determining, by the duplicate detection module, not to process the item for at least one of payment and presentment.

19. The method of claim 12, wherein the duplicate detection module determines that the ICL file is a duplicate if the information stored in the record includes the unique identifier assigned to the ICL file.

20. The method of claim 12, wherein the unique identifier comprises hashed information related to the ICL.

21. The method of claim 20, wherein the hashed information comprises at least one of a byte count of the ICL, a total number of bundles in the ICL, a total number of items in the ICL, and a total dollar value of the items in the ICL.

22. The method of claim 20, wherein the hashed information comprises at least two of a byte count of the ICL, a total number of bundles in the ICL, a total number of items in the ICL, and a total dollar value of the items in the ICL.

23. A computer-implemented method for preventing duplicative electronic check processing, comprising the steps of:
assigning, by a duplicate detection module, a unique identifier to an item bundle of an image cash letter ("ICL") based upon information associated with the item bundle;
determining, by the duplicate detection module, whether the item bundle is a duplicate by comparing the unique identifier assigned to the item bundle with information stored in a record;
in response to determining that the item bundle is a duplicate, determining, by the duplicate detection module, not to process the item bundle for at least one of payment and presentment; and
in response to determining that the item bundle is not a duplicate, assigning, by the duplicate detection module, a unique identifier to at least one element of the item bundle based upon information associated with the at least one element of the item bundle,
wherein the duplicate detection module is implemented in a computer system that comprises instructions stored in a machine-readable medium and a processor that executes the instructions.

24. The method of claim 23, wherein the unique identifier comprises information derived from information within the item bundle.

25. The method of claim 23, wherein the unique identifier comprises at least one objective metric of the item bundle.

26. The method of claim 25, wherein the objective metric comprises a byte count of the item bundle.

27. The method of claim 23, further comprising the steps of:
determining, by the duplicate detection module, whether the at least one element of the item bundle is a duplicate by comparing the unique identifier assigned to the at least one element of the item bundle with information stored in the record; and in response to determining that the at least one element of the item bundle is not a duplicate, storing the unique identifier assigned to the at least one element of the item bundle in the record.

28. The method of claim 23, further comprising the steps of:

determining, by the duplicate detection module, whether the at least one element of the item bundle is a duplicate by comparing the unique identifier assigned to the at least one element of the item bundle with information stored in the record; and in response to determining that the at least one element of the item bundle is a duplicate, determining, by the duplicate detection module, not to process the at least one element of the item bundle for at least one of payment and presentment.

29. The method of claim 23, wherein the duplicate detection module determines that the item bundle is a duplicate if the information stored in the record includes the unique identifier assigned to the item bundle.

30. The method of claim 23, wherein the unique identifier comprises hashed information related to the item bundle.

31. The method of claim 30, wherein the hashed information comprises at least one of a byte count of the item bundle, a total number of items in the item bundle, and a total dollar value of the items in the item bundle.

32. The method of claim 30, wherein the hashed information comprises at least two of a byte count of the item bundle, a total number of items in the item bundle, and a total dollar value of the items in the item bundle.

33. A computer-implemented method for preventing duplicative electronic check processing, comprising the steps of:

assigning, by a duplicate detection module, a unique identifier to at least a portion of an item bundle of an image cash letter ("ICL") based upon information associated with the ICL;

determining, by the duplicate detection module, whether the at least a portion of the item bundle is a duplicate by comparing the unique identifier assigned to the at least a portion of the item bundle with information stored in a record;

in response to determining that the at least a portion of the item bundle is a duplicate, determining, by the duplicate detection module, not to process the at least a portion of the item bundle for at least one of payment and presentment; and in response to determining that the at least a portion of the item bundle is not a duplicate, assigning, by the duplicate detection module, a unique identifier to at least one element of the at least a portion of the item bundle based upon information associated with the at least one element, wherein the duplicate detection module is implemented in a computer system that comprises instructions stored in a machine-readable medium and a processor that executes the instructions.

34. The method of claim 33, wherein the unique identifier comprises information derived from information within the item.

35. The method of claim 33, wherein the unique identifier comprises at least one objective metric of the item.

36. The method of claim 33, further comprising the step of:

in response to determining that the item is not a duplicate, storing the unique identifier assigned to the item in the record.

37. The method of claim 33, wherein the duplicate detection module determines that the item is a duplicate if the information stored in the record includes the unique identifier assigned to the item.

38. The method of claim 33, wherein the unique identifier comprises hashed information related to the item.

39. The method of claim 38, wherein the hashed information comprises at least one of a byte count of the item and dollar value of the item.

40. The method of claim 38, wherein the hashed information comprises a byte count of the item and a dollar value of the item.

41. A computer-implemented method for preventing duplicative electronic check processing, comprising the steps of:

assigning, by a duplicate detection module, a unique identifier to an item of an image cash letter ("ICL"), the unique identifier being predictable and repeatable such that the duplicate detection module will assign the same unique identifier to the same item on separate occasions;

determining, by the duplicate detection module, whether the item is a duplicate by comparing the unique identifier assigned to the item with information stored in a record; and in response to determining that the item is a duplicate, determining, by the duplicate detection module, not to process the item for at least one of payment and presentment, wherein the unique identifier comprises at least one objective metric of the item, the objective metric comprises a byte count of the item, and the duplicate detection module is implemented in a computer system that comprises instructions stored in a machine-readable medium and a processor that executes the instructions.

42. A computer program product, comprising:

a computer-readable medium having computer-readable program code encoded thereon for preventing duplicative electronic check processing, the computer-readable medium comprising:

computer-readable program code that is computer executable for assigning a unique identifier to at least a portion of an image cash letter ("ICL") file based upon information associated with the ICL file;

computer-readable program code that is computer executable for determining that the at least a portion of the ICL file is a duplicate if information stored in a record already includes the unique identifier assigned to the at least a portion of the ICL file;

computer-readable program code that is computer executable for determining not to process the at least a portion of the ICL file for at least one of payment and presentment in response to determining that the at least a portion of the ICL file is a duplicate; and computer-readable program code that is computer executable for, in response to determining that the at least a portion of the ICL file is not a duplicate, assigning a unique identifier to at least one element of the at least a portion of the ICL file based upon information associated with the at least one element.

43. The computer program product of claim 42, wherein the at least a portion of the ICL file comprises at least one of an ICL and an item bundle.

44. The computer program product of claim 42, wherein the unique identifier comprises information derived from information within the ICL file.

45. The computer program product of claim 42, wherein the unique identifier comprises at least one objective metric of the at least a portion of the ICL file.

46. The computer program product of claim 42, wherein the objective metric comprises a byte count of the at least a portion of the ICL file.

47. The computer program product of claim 42, further comprising
 computer-readable program code that is computer executable for determining that the at least one element is a duplicate if information stored in the record includes the unique identifier assigned to the at least one element; and
 computer-readable program code that is computer executable for, in response to determining that the at least one element is not a duplicate, storing the unique identifier assigned to the at least one element in the record.

48. The computer program product of claim 42, wherein the computer-readable program code that is computer executable for determining that the at least a portion of the ICL file is a duplicate comprises computer-readable program code that is computer executable for determining that the at least a portion of the ICL file is a duplicate if the information stored in the record includes the unique identifier assigned to the ICL file.

49. The computer program product of claim 42, wherein the unique identifier comprises hashed information related to the at least a portion of the ICL file.

50. The computer program product of claim 49, wherein the hashed information comprises at least one of a byte count of the ICL file, a total number of ICL's in the ICL file, a total number of bundles in the ICL file, a total number of items in the ICL file, and a total dollar value of the items in the ICL file.

51. The computer program product of claim 49, wherein the hashed information comprises at least two of a byte count of the ICL file, a total number of ICL's in the ICL file, a total number of bundles in the ICL file, a total number of items in the ICL file, and a total dollar value of the items in the ICL file.

52. A system for preventing duplicative electronic check processing, comprising:
 means for assigning a unique identifier to at least a portion of an image cash letter ("ICL") file based upon information associated with the ICL file;
 means for determining that the at least a portion of the ICL file is a duplicate if information stored in a record already includes the unique identifier assigned to the at least a portion of the ICL file;
 means for determining not to process the at least a portion of the ICL file for at least one of payment and presentment in response to determining that the at least a portion of the ICL file is a duplicate; and
 means for, in response to determining that the at least a portion of the ICL file is not a duplicate, assigning a unique identifier to at least one element of the at least a portion of the ICL file based upon information associated with the at least one element.

53. The system of claim 52, wherein the at least a portion of the ICL file comprises at least one of an ICL and an item bundle.

54. The system of claim 52, wherein the unique identifier comprises information derived from information within the ICL file.

55. The system of claim 52, wherein the unique identifier comprises at least one objective metric of the at least a portion of the ICL file.

56. The system of claim 52, further comprising
 means for determining that the at least one element is a duplicate if information stored in the record includes the unique identifier assigned to the at least one element; and
 means for, in response to determining that the at least one element is not a duplicate, storing the unique identifier assigned to the at least one element in the record.

57. The system of claim 52, wherein the means for determining that the at least a portion of the ICL file is a duplicate determines that the at least a portion of the ICL file is a duplicate if the information stored in the record includes the unique identifier assigned to the ICL file.

58. The system of claim 52, wherein the unique identifier comprises hashed information related to the at least a portion of the ICL file.

59. The system of claim 58, wherein the hashed information comprises at least one of a byte count of the ICL file, a total number of ICL's in the ICL file, a total number of bundles in the ICL file, a total number of items in the ICL file, and a total dollar value of the items in the ICL file.

60. The system of claim 58, wherein the hashed information comprises at least two of a byte count of the ICL file, a total number of ICL's in the ICL file, a total number of bundles in the ICL file, a total number of items in the ICL file, and a total dollar value of the items in the ICL file.

61. A computer system for preventing duplicative electronic check processing, comprising:
 a database that stores a record;
 a duplicate detection module comprising instructions on a computer-readable medium, the instructions
  (1) assigning a unique identifier to at least a portion of an image cash letter ("ICL") file based upon information associated with the ICL file,
  (2) determining whether the at least a portion of the ICL file is a duplicate by comparing the unique identifier assigned to the at least a portion of the ICL file with information stored in the record,
  (3) in response to determining that the at least a portion of the ICL file is a duplicate, determining not to process the at least a portion of the ICL file for at least one of payment and presentment, and
  (4) in response to determining that the at least a portion of the ICL file is not a duplicate, assigning, by the duplicate detection module, a unique identifier to at least one element of the at least a portion of the ICL file based upon information associated with the at least one element; and
 a processor that executes the instructions of the duplicate detection module.

62. The system of claim 61, wherein the at least a portion of the ICL file comprises at least one of an ICL and an item bundle.

63. The system of claim 61, wherein the unique identifier comprises information derived from information within the ICL file.

64. The system of claim 61, wherein the unique identifier comprises at least one objective metric of the at least a portion of the ICL file.

65. The system of claim 61, wherein the duplicate detection module further comprises instructions
- determining whether the at least one element is a duplicate by comparing the unique identifier assigned to the at least one element with information stored in the record; and
- storing the unique identifier assigned to the at least one element in the record, in response to determining that the at least one element is not a duplicate.

66. The system of claim 61, wherein the duplicate detection module further comprises instructions determining that the at least a portion of the ICL file is a duplicate if the information stored in the record includes the unique identifier assigned to the ICL file.

67. The system of claim 61, wherein the unique identifier comprises hashed information related to the at least a portion of the ICL file.

68. The system of claim 67, wherein the hashed information comprises at least one of a byte count of the ICL file, a total number of ICL's in the ICL file, a total number of bundles in the ICL file, a total number of items in the ICL file, and a total dollar value of the items in the ICL file.

69. The system of claim 67, wherein the hashed information comprises at least two of a byte count of the ICL file, a total number of ICL's in the ICL file, a total number of bundles in the ICL file, a total number of items in the ICL file, and a total dollar value of the items in the ICL file.

* * * * *